US006633967B1

(12) United States Patent
Duncan (10) Patent No.: US 6,633,967 B1
(45) Date of Patent: Oct. 14, 2003

(54) COHERENT TRANSLATION LOOK-ASIDE BUFFER

(75) Inventor: Samuel H. Duncan, Arlington, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 09/652,985

(22) Filed: Aug. 31, 2000

(51) Int. Cl.$^7$ .............................................. G06F 12/00
(52) U.S. Cl. ............................ 711/207; 711/210; 710/3
(58) Field of Search ..................... 710/3; 711/141–146, 711/207, 210

(56) References Cited

U.S. PATENT DOCUMENTS

| 5,339,397 | A | * | 8/1994 | Eikill et al. ................. | 711/206 |
|---|---|---|---|---|---|
| 5,515,523 | A | | 5/1996 | Kalkunte et al. | |
| 5,625,779 | A | | 4/1997 | Solomon et al. | |
| 5,884,100 | A | | 3/1999 | Normoyle et al. | |
| 5,906,001 | A | * | 5/1999 | Wu et al. ..................... | 711/154 |
| 6,014,690 | A | | 1/2000 | VanDoren et al. | |
| 6,067,595 | A | * | 5/2000 | Lindenstruth ............... | 710/307 |
| 6,094,686 | A | | 7/2000 | Sharma | |
| 6,105,113 | A | * | 8/2000 | Schimmel .................... | 711/146 |
| 6,128,684 | A | * | 10/2000 | Okayama .................... | 710/109 |
| 6,182,195 | B1 | * | 1/2001 | Laudon et al. .............. | 711/141 |
| 6,247,102 | B1 | | 6/2001 | Chin et al. | |
| 6,260,094 | B1 | * | 7/2001 | Davis et al. ................. | 710/314 |
| 6,263,403 | B1 | * | 7/2001 | Traynor ....................... | 711/133 |
| 6,526,497 | B1 | * | 2/2003 | LaBerge et al. ............. | 711/207 |

OTHER PUBLICATIONS

Bryan S. Rosenburg, "Low–Synchronization Translation Lookaside Buffer Consistency in Large–Scale Shared–Memory Multiprocessors", 1989, ACM.*

Chapter 3 Memory Management, http://www.linuxdoc.org/LDP/tlk/mm/memory.html, (c) 1996–1999, pp. 1–23.

Multiprocessors (7 pages).

Russo, Andrew P., The AlphaServer 2100 I/O Subsystem, http://www.digital.com, (c) 1994, pp. 1–13.

Duncan, Samuel H., Keefer, Craig D., McLaughlin, Thomas A., High Performance I/O Design in the AlphaServer 4100 Symmetric Multiprocessing System, Compaq Digital Technical Jounrnal, pp. 1–24.

Steinman, Maurice B., Harris, George J., Kocev, Andrej, Lamere, Virginia C. and Pannell, Roger D., The AlphaServer 4100 Cached Processor Module Architecture and Design, Digital Technical Journal, pp. 1–29.

Bannon, Peter, Alpha 21364: A Scalable Single–chip SMP, (c) 1999, pp. 1–4.

New Compaq AlphaServer GS Series Architecture White Paper, Compaq Computer Corporation, (c)2000, pp. 1–11.

\* cited by examiner

Primary Examiner—Hong Kim
Assistant Examiner—Woo H. Choi (57) ABSTRACT

The invention is a coherent translation look-aside buffer (TLB) for use in an input/output (I/O) bridge of a symmetrical multiprocessing (SMP) system. The contents of the TLBs may be kept in one of two possible states: exclusive or invalid. When the I/O bridge receives a TLB entry for storage in its TLB, the state of that entry is exclusive. Specifically, the TLB is considered the exclusive owner of the respective TLB entry. The exclusively owned TLB entry may be used by the TLB to translate I/O addresses to system addresses. If some other agent or entity of the SMP system seeks access to the TLB entry (e.g., for purposes of executing a read or write operation), the TLB is notified and the state of the TLB entry transitions to invalid. With the TLB entry in the invalid state, the TLB can no longer use the TLB entry for translating I/O addresses to system addresses.

27 Claims, 9 Drawing Sheets

COHERENT TRANSLATION LOOK-ASIDE BUFFER

INCORPORATION BY REFERENCE OF RELATED APPLICATIONS

This patent application is related to the following co-pending, commonly owned U.S. patent applications, all of which were filed on even date with the within application for United States Patent and are each hereby incorporated by reference in their entirety:

U.S. patent application Ser. No. 09/652,644 entitled ADAPTIVE DATA FETCH PREDICTION ALGORITHM;

U.S. patent application Ser. No. 09/653,133 entitled UNIQUE METHOD OF REDUCING LOSSES IN CIRCUITS USING $V^2$ PWM CONTROL;

U.S. patent application Ser. No. 09/652,641 entitled IO SPEED AND LENGTH PROGRAMMABLE WITH BUS POPULATION;

U.S. patent application Ser. No. 09/653,180 entitled PARTITION CONFIGURATION VIA SEPARATE MICROPROCESSORS;

U.S. patent application Ser. No. 09/944,517 entitled SYSTEM AND METHOD FOR INCREASING THE COUNT OF OUTSTANDING SPLIT TRANSACTIONS;

U.S. patent application Ser. No. 09/652,984 entitled SYSTEM AND METHOD FOR PROVIDING FORWARD PROGRESS AND AVOIDING STARVATION AND LIVELOCK IN A MULTIPROCESSOR COMPUTER SYSTEM;

U.S. patent application Ser. No. 09/653,180 entitled ONLINE ADD/REMOVAL OF SERVER MANAGEMENT INFRASTRUCTURE;

U.S. patent application Ser. No. 09/652,494 entitled AUTOMATED BACKPLANE CABLE CONNECTION IDENTIFICATION SYSTEM AND METHOD;

U.S. patent application Ser. No. 09/652,459 entitled CLOCK FORWARDING DATA RECOVERY;

U.S. patent application Ser. No. 09/652,980 entitled CLOCK FORWARD INITIALIZATION AND RESET SIGNALING TECHNIQUE;

U.S. patent application Ser. No. 09/944,515 entitled PASSIVE RELEASE AVOIDANCE TECHNIQUE;

U.S. patent application Ser. No. 09/652,645 entitled DETERMINISTIC HARDWARE BEHAVIOR BETWEEN MULTIPLE ASYNCHRONOUS CLOCK DOMAINS THROUGH THE NOVEL USE OF A PLL; and U.S. patent application Ser. No. 09/655,171 entitled VIRTUAL TIME OF YEAR CLOCK.

BACKGROUND OF THE INVENTION

1. Field of the Invention

This invention relates to computer architectures and, more specifically, to mechanisms for translating memory addresses in distributed, shared memory multiprocessor computer systems.

2. Background Information

Distributed shared memory computer systems, such as symmetric multiprocessor (SMP) systems, support high-performance application processing. Conventional SMP systems include a plurality of processors coupled together by a bus. One characteristic of SMP systems is that memory space is typically shared among all of the processors. That is, each processor accesses programs in the shared memory, and processors communicate with each other via that memory (e.g., through messages and status information left in shared address spaces). In some SMP systems, the processors may also be able to exchange signals directly. One or more operating systems are typically stored in the shared memory. These operating systems control the distribution of processes or threads among the various processors. The operating system kernels may execute on any processor, and may even execute in parallel. By allowing many different processors to execute different processes or threads simultaneously, the execution speed of a given application may be greatly increased.

Figure 1:
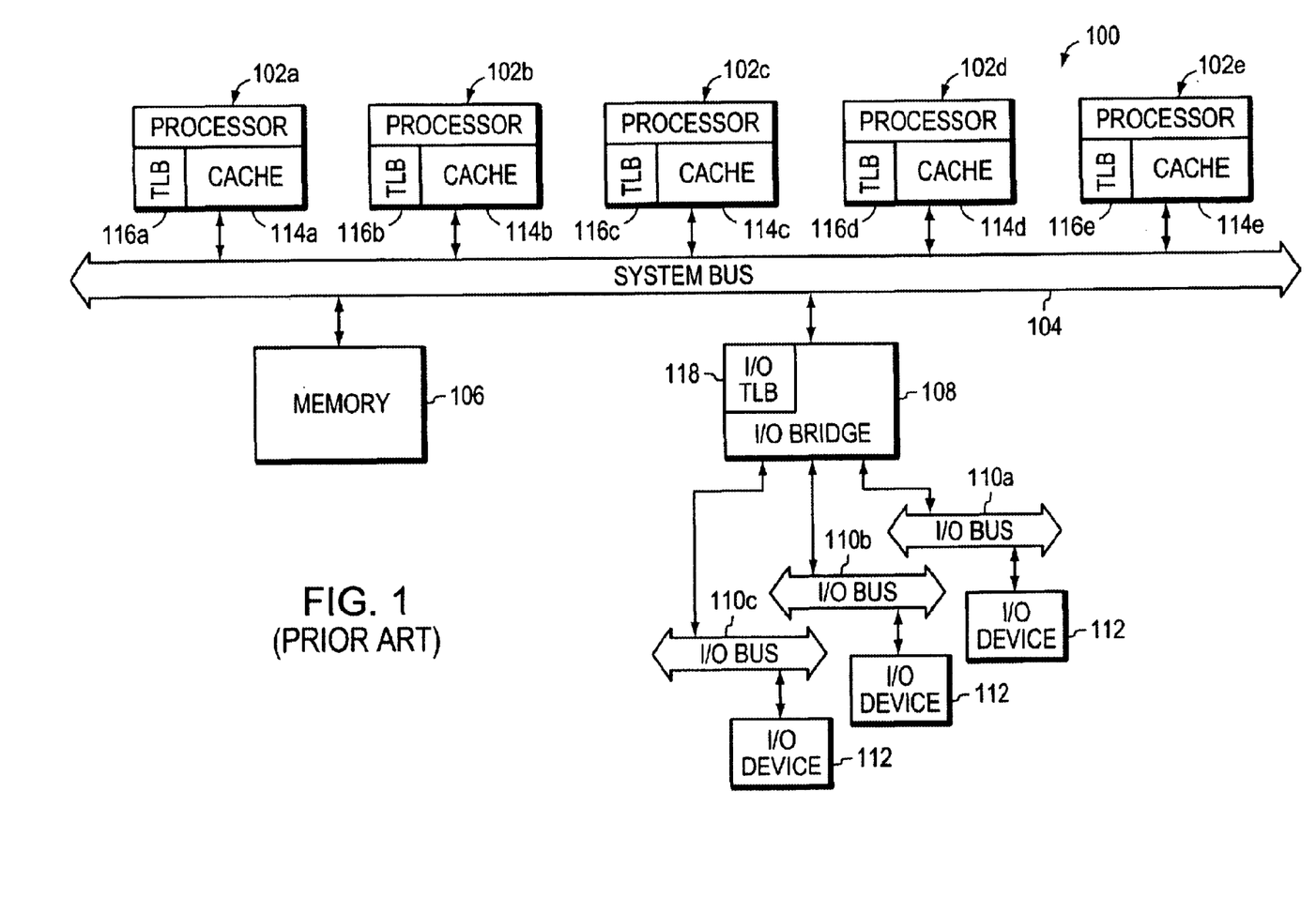
FIG. 1, previously discussed, is a schematic block diagram of a conventional symmetrical multiprocessor computer system.

FIG. 1 is a block diagram of a conventional SMP system 100. System 100 includes a plurality of processors 102a–e, each connected to a system bus 104. A memory 106 and an input/output (I/O) bridge 108 are also connected to the system bus 104. The I/O bridge 108 is also coupled to one or more I/O busses 110a–c. The I/O bridge 108 basically provides a "bridging" function between the system bus 104 and the I/O busses 110a–c. Various I/O devices 112, such as disk drives, data collection devices, keyboards, CD-ROM drives, etc., may be attached to the I/O busses 110a–c. Each processor 102a–e can access memory 106 and/or various input/output devices 112 via the system bus 104. Each processor 102a–e has at least one level of cache memory 114a–e that is private to the respective processor 102a–e.

The cache memories 114a–e typically contain an image of data from memory 106 that is being utilized by the respective processor 102a–e. Since the cache memories of two processors (e.g., caches 114b and 114e) may contain overlapping or identical images of data from main memory 106, if one processor (e.g., processor 102b) were to alter the data in its cache (e.g., cache 114b), the data in the other cache (e.g., cache 114e) would become invalid or stale. To prevent the other processor (e.g., processor 102e) from acting on invalid or stale data, SMP systems, such as system 100, typically include some type of cache coherency protocol.

In general, cache coherency protocols cause other processors to be notified when an update (e.g., a write) is about to take place at some processor's cache. Other processors, to the extent they also have copies of this same data in their caches, may then invalidate their copies of the data. The write is typically broadcast to the processors which then update the copies of the data in their local caches. Protocols or algorithms, some of which may be relatively complex, are often used to determine which entries in a cache should be overwritten when more data than can be stored in the cache is received.

Processors, such as processors 102, typically refer to program instructions and data by their "logical addresses", which are independent of that information's location in memory 106. Accordingly, as information is loaded into memory 106 (e.g., from disks or tape drives), logical addresses from the processors 102 must be translated to "physical addresses" that specify the actual locations of the respective information within memory 106. Accordingly, each processor 102 also includes an address translation device, typically a translation look-aside buffer (TLB) 116a–e. The TLBs 116 translate logical addresses to physical addresses. As information is brought into and moved around within memory 106, the information in the TLBs 116a–e must be updated. Typically, when the information in one or more TLBs 116 needs to be updated, the operating system executes a translation buffer invalidate all (TBIA) function or instruction sequence. A TLB, e.g., TLB 116c, needs to be updated each time its processor, e.g., processor 102c, changes context from one thread to another or when a new page is mapped to or removed from the specific process context. As part of the TBIA, which is specifically software initiated, the processors 102 flush the entire contents of their TLBs 116, and return acknowledgments meants to the operating system. When all processors 102 have acknowledged the flushing of their TLBs 116, the new data is copied into the TLBs. All TLB entries are flushed in order to simplify the operating system software charged with executing the TBIA. For example, TBIAs do not need to specify the address of any TLB entries to be invalidated; they are all invalidated.

In addition to the TBIA, some systems are capable of executing a translation buffer invalidate single (TBIS) function. Here, only a single TLB entry is invalidated. However, execution of the TBIS function is generally more completed than the TBIA as the TBIS must identify and specify the TLB entry to be invalidated.

I/O bridge 108 may also include a TLB 118. The I/O TLB 118 is used to translate addresses from the I/O domain (i.e., addresses specified by I/O devices 112) to physical addresses of memory 106 (i.e., system addresses). There are basically two ways of translating I/O domain addresses to system addresses. First, I/O addresses may be "direct mapped" to system addresses. With direct mapping, there is a one to one linear mapping of a region of I/O address space to a contiguous address space of the same size within memory 106. The translation of a direct mapped I/O domain address to a system address is relatively straightforward. In particular, a base address, which specifies where in memory 106 the direct mapped I/O space begins, is typically concatenated with some portion of the I/O domain address itself (i.e., an "offset") to generate the translated system address. In addition to direct mapping, I/O domain addresses may be "scatter gather" mapped, which is sometimes also called graphics address relocation table (GART) mapping. With scatter gather or GART mapping, the I/O address space is broken up (typically into blocks or pages) and distributed or "scattered" about the memory space of memory 106. To translate an I/O domain address that is scatter gather mapped, the I/O TLB 118 is used. More specifically, the I/O TLB 118 keeps track of where the I/O addressed blocks are located within the space of memory 106 so that any selected I/O addressed block may be "gathered" upon request by an I/O device 112.

To keep the contents of the I/O TLB 118 up-to-date, it may also be subject to a TBIA instruction sequence from the operating system. That is, when the contents of I/O TLB 118 need to be updated, an I/O TBIA is initiated. The contents of all I/O TLBs 118 are flushed and replaced with current information. It is also possible for software to be configured in order to execute a TBIS function on I/O TLBs. These software initiated coherency protocols have generally proven sufficient for computer systems having relatively few I/O bridges 108, and thus relatively few I/O TLBs 118. As the number of I/O bridges and thus the number of I/O TLBs increases, however (so as to support additional I/O devices 112 by the system 100, for example), the processing of TBIA and/or TBIS instruction sequences for I/O TLBs begins to consume significant processing and memory resources. It may also take some time to complete the I/O TBIA and/or TBIS functions if there are many I/O bridges 108. While the I/O TBIA and/or TBIS are in process, I/O devices 112 whose memory space has been scatter gather mapped are typically unable to access memory 106, which can disrupt operation of the SMP system 100.

Accordingly, a need exists for a system and method for efficiently maintaining the coherency of I/O TLBs, even as the number of I/O TLBs increases.

SUMMARY OF THE INVENTION

Briefly, the invention relates to a coherent translation look-aside buffer (TLB) for use in an input/output (I/O) bridge of a symmetrical multiprocessing (SMP) system. The SMP system includes a plurality of interconnected processors having corresponding caches, one or more memories that are shared by the processors, and one or more I/O devices that are coupled to the I/O bridge for communication with the processors and memories. One or more directories are used to maintain the coherence of data stored in the memories and/or the processor caches. Page tables providing translations between I/O domain addresses that are "scatter gather" mapped into the system domain are also stored in the memories. When an I/O device specifies an I/O domain address, the I/O bridge checks to see if the I/O domain address is contained in its TLB. If not, the I/O bridge obtains a copy of the respective page table from the one or more memories and stores it in its TLB.

In accordance with the invention, the directories are up-dated to reflect that the I/O bridge now has exclusive ownership of the page table. In particular, ownership by the I/O bridge is exclusive relative to the processors and other I/O bridges of the SMP system. That is, even though the I/O bridge does not intend to modify the page table, it is still required to and does obtain exclusive ownership of the page table. If a processor or another I/O bridge requests the same page table from the directories, the I/O bridge having the page table is forced to invalidate its copy. The page table is then provided to the requesting processor or I/O bridge for reading and/or modifying. Accordingly, the TLB entries at the I/O bridges are kept coherent without requiring the SMP to execute I/O TLB invalidate all or sequence (TBIA or TBIS) instruction sequences.

BRIEF DESCRIPTION OF THE DRAWINGS

The above and further advantages of the invention may be better understood by referring to the following description in conjunction with the accompanying drawings, in which like reference numbers indicate identical or functionally similar elements.

DETAILED DESCRIPTION OF AN ILLUSTRATIVE EMBODIMENT

Figure 2:
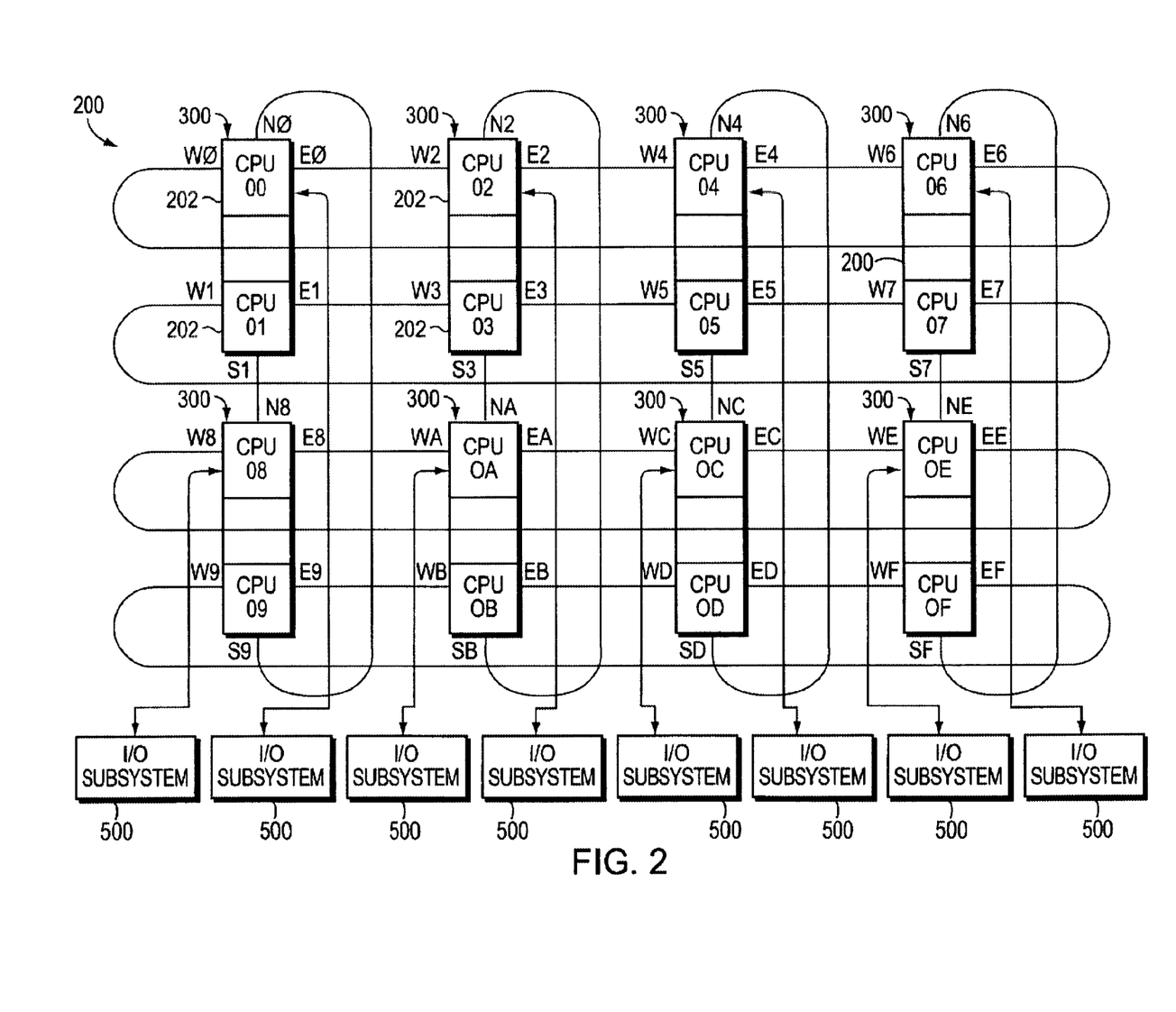
FIG. 2 is a schematic block diagram of a symmetrical multiprocessor computer system in accordance with the present invention.

FIG. 2 is a schematic block diagram of a symmetrical multiprocessor (SMP) system 200 comprising a plurality of processor modules 300 interconnected to form a two dimensional (2D) torus configuration. Each processor module 300 comprises two central processing units (CPUs) or processors 202 and has connections for two input/output (I/O) ports (one for each processor 202) and six inter-processor (IP) network ports. The IP network ports are preferably referred to as North (N), South (S), East (E) and West (W) compass points and connect to two unidirectional links. The North-South (NS) and East-West (EW) compass point connections create a (Manhattan) grid, while the outside ends wrap-around and connect to each other, thereby forming the 2D torus. The SMP system 200 further comprises a plurality of I/O subsystems 500. I/O traffic enters the processor modules 300 of the 2D torus via the I/O ports. Although only one I/O subsystem 500 is shown connected to each processor module 300, because each processor module 300 has two I/O ports, any given processor module 300 may be connected to two I/O subsystems 500 (i.e., each processor 202 may be connected to its own I/O subsystem 500).

Figure 3:
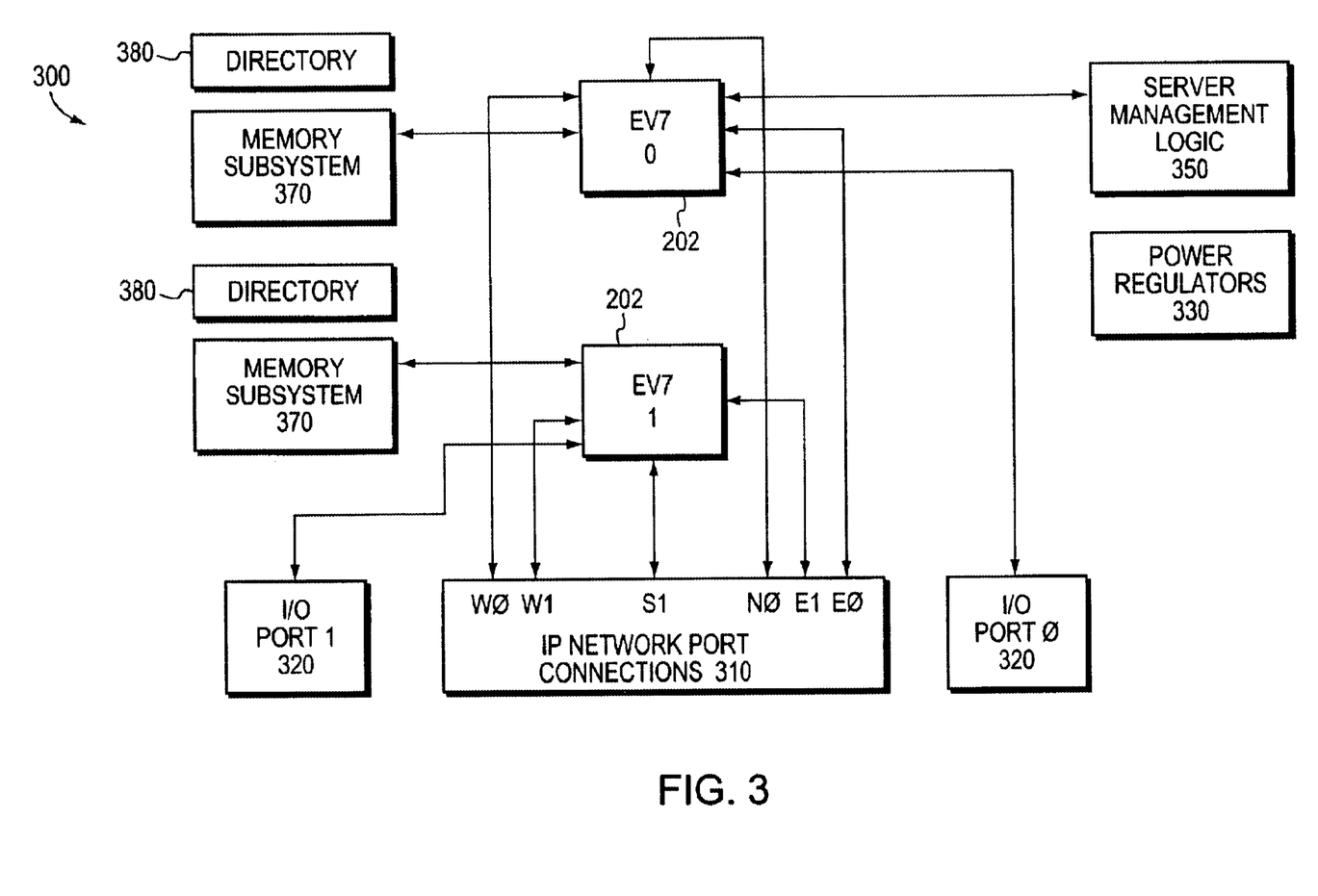
FIG. 3 is a schematic block diagram of a dual processor module of the computer system of FIG. 2.

FIG. 3 is a schematic block diagram of the dual CPU (2P) module 300. As noted, the 2P module 300 comprises two CPUs 202 each having connections 310 for the IP ("compass") network ports and an I/O port 320. The 2P module 300 also includes one or more power regulators 330, server management logic 350 and two memory subsystems 370 each coupled to a respective memory port (one for each CPU 202). The system management logic 350 cooperates with a server management system to control functions of the SMP system 200. Each of the N, S, E and W compass points along with the I/O and memory ports, moreover, use clock-forwarding, i.e., forwarding clock signals with the data signals, to increase data transfer rates and reduce skew between the clock and data.

Each CPU 202 of a 2P module 300 is preferably an "EV7" processor that includes part of an "EV6" processor as its core together with "wrapper" circuitry comprising two memory controllers, an I/O interface and four network ports. In the illustrative embodiment, the EV7 address space is 44 physical address bits and supports up to 256 processors 202 and 256 I/O subsystems 500. The EV6 core preferably incorporates a traditional reduced instruction set computer (RISC) load/store architecture. In the illustrative embodiment described herein, the EV6 core is an Alpha® 21264 processor chip manufactured by Compaq Computer Corporation of Houston, Tex., with the addition of a 1.75 megabyte (MB) 7-way associative internal cache and "CBOX", the latter providing integrated cache controller functions to the EV7 processor. However, it will be apparent to those skilled in the art that other types of processor chips may be advantageously used. The EV7 processor also includes an "RBOX" that provides integrated routing/networking control functions with respect to the compass points, and a "ZBOX" that provides integrated memory controller functions for controlling the memory subsystem 370.

Each memory subsystem 370 may be and/or may include one or more conventional or commercially available dynamic random access memory (DRAM), synchronous DRAM (SDRAM), double data rate SDRAM (DDR-SDRAM) or Rambus DRAM (RDRAM) memory devices.

Figure 4:
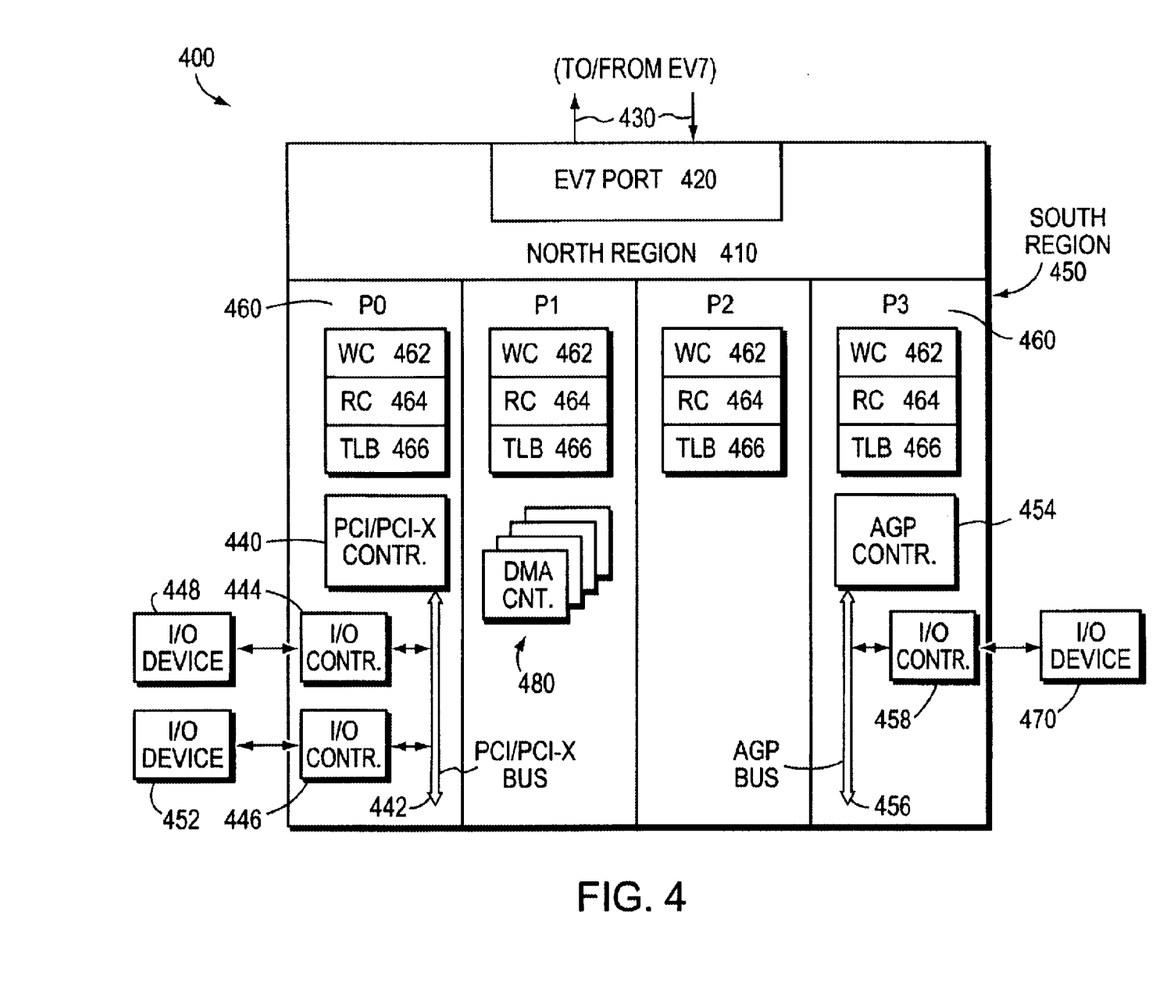
FIG. 4 is a schematic block diagram of an I/O bridge in accordance with the present invention.

FIG. 4 is a schematic block diagram of an I/O bridge 400, which may be referred to as an "IO7", that provides a fundamental building block for each of the I/O subsystems 500. The IO7 400 is preferably implemented as an application specific integrated circuit (ASIC). As described above, each EV7 processor 202 includes one I/O port; however, there is no requirement that each processor 200 be connected to an I/O ASIC. The cable coupling the IO7 400 to the EV7 202 on a 2P module 300 may be up to six meters or more in length.

The IO7 400 comprises a North circuit region 410 that interfaces to the EV7 processor 202 and a South circuit region 450 that includes a plurality of I/O ports 460 (P0–P3) that preferably interface to standard I/O buses. An EV7 port 420 of the North region 410 couples to the EV7 processor 202 via two unidirectional, clock forwarded links 430. In the illustrative embodiment, three of the four I/O ports 460 interface to the well-known Peripheral Component Interface (PCI) and/or PCI-Extended (PCI-X) bus standards, while the fourth port interfaces to an Accelerated Graphics Port (AGP) bus standard. More specifically, ports P0–P2 include a PCI and/or PCI-X controller, such as controller 440 at port P0, which is coupled to and controls a respective PCI and/or PCI-X bus, such as bus 442. Attached to bus 442 may be one or more I/O controller cards, such as controllers 444, 446. Each I/O controller 444, 446 interfaces to and is responsible for a respective I/O device 448, 452 to which the controller 444, 446 is coupled. Port P3 may include an AGP controller 454 rather than a PCI or PCI-X controller. The AGP controller 454 of port P3 controls an AGP bus 456 at port P3. Attached to the AGP bus 456 may be an I/O controller card 458 that interfaces to and is responsible for a corresponding AGP I/O device 470.

In accordance with an aspect of the present invention, a cache coherent domain of the SMP system 200 extends into the IO7 400 and, in particular, to I/O buffers or caches located within each I/O port 460 of the IO7 400. Specifically, the cache coherent domain extends to a write cache (WC) 462, a read cache (RC) 464 and a translation look-aside buffer (TLB) 466 located within each I/O port 460 of South region 450. As described further herein, WC and RC 462, 464, as well as TLB 466 function as coherent buffers.

Each port 460 of South region 450 also include a plurality of direct memory access (DMA) controllers 480. For clarity, DMA controllers 480 are only shown at port P1. The DMA controllers 480 interface with the PCI/PCI-X and AGP controllers 440, 454, WC 462, RC 464, TLB 466 and the North region 510. The DMA controllers 480 are basically responsible for managing I/O transactions (e.g., DMA reads and writes) as they move between the North and South regions 410, 450.

Figure 5:
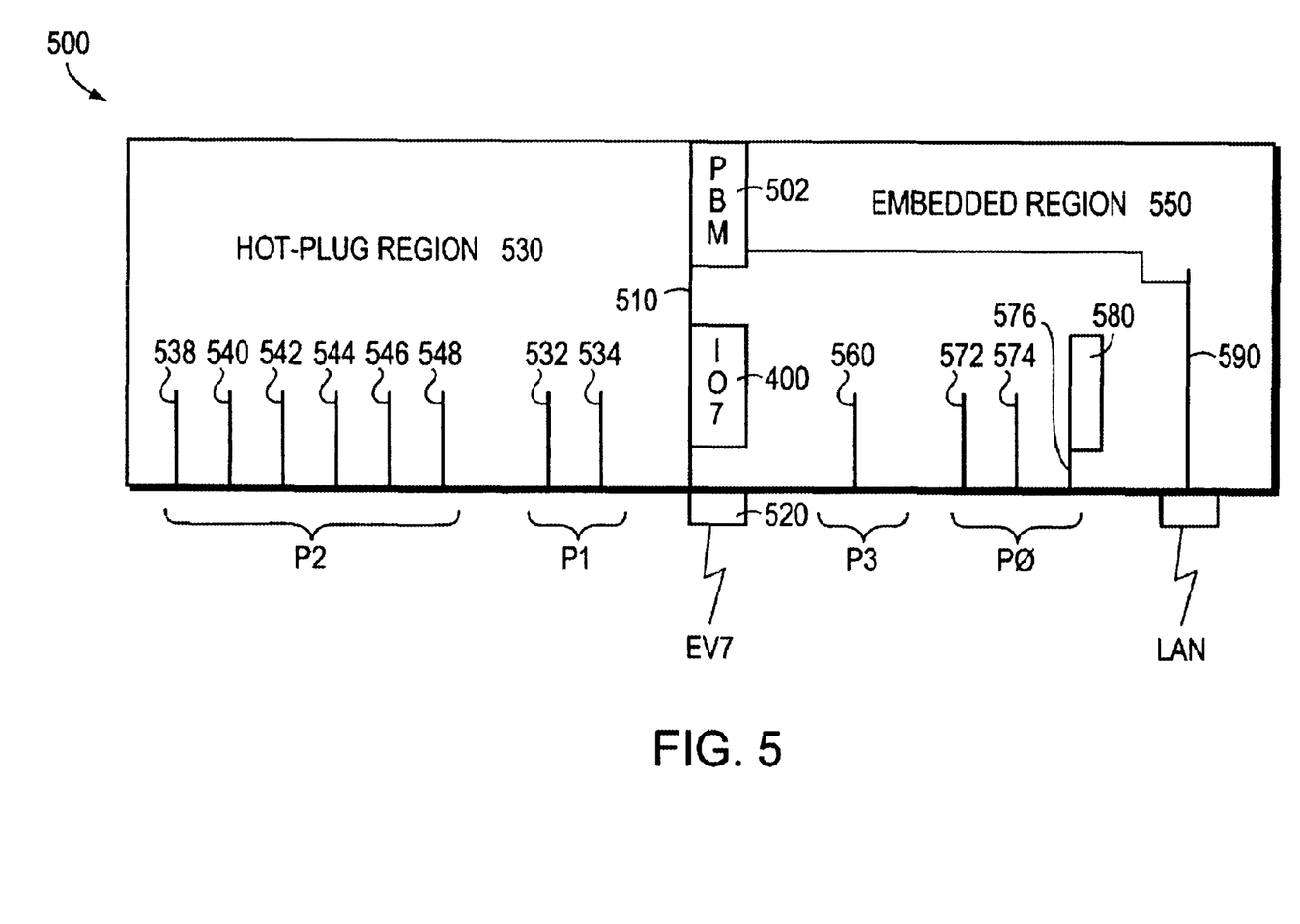
FIG. 5 is a schematic block diagram of an I/O subsystem of the computer system of FIG. 2.

FIG. 5 is a schematic block diagram of an I/O subsystem or drawer 500 of the SMP system 200. Each I/O subsystem 500 includes a first I/O riser card 510 containing an IO7 400, a connector 520 coupling the IO7 400 to its EV7 processor 202 and a plurality of I/O buses. The speed of the I/O buses contained within the I/O subsystem 500 is a finction of the length and the number of loads of each I/O bus. The I/O subsystem 500 is divided into two parts: a hot-plug region 530 and an embedded region 550. In the illustrative embodiment, there is a dedicated slot 560 adjacent to the I/O riser card 510 within the embedded region 550 that is dedicated to a 4×AGP Pro graphics card. Additional slots (e.g., for power and an additional data path) may be provided to support the AGP Pro card. Also included within the embedded region 550 are three standard, 64-bit PCI card slots 572–576, which are available for embedded I/O card options. For example, an I/O standard module card 580 may be inserted within one of the PCI card slots 572–576.

Each I/O subsystem 500 also includes power supplies, fans and storage/load devices (not shown). The I/O standard module card 580 contains a Small Computer System Interface (SCSI) controller for storage/load devices and a Universal Serial Bus (USB) that enables keyboard, mouse, CD and similar input/output functions. The embedded region 550 of the I/O subsystem 500 is typically pre-configured and does not support hot-swap operations. In contrast, the hot-plug region 530 includes a plurality of slots adapted to support hot-swap. Specifically, there are two ports 532, 534 of the hot plug region 530 dedicated to I/O port one (PI of FIG. 4) and six slots 538–548 dedicated to I/O port two (P2). Likewise, the dedicated AGP Pro slot 560 comprises port three (P3) and the three standard PCI slots 572–576 comprise port zero (P0). The I/O buses in the hot-plug region 530 are configured to support PCI and/or PCI-X standards operating at 33 MHz, 50 MHz, 66 MHz, 100 MHz and/or 133 MHz. Not all slots are capable of supporting all of these operating speeds.

Also included within the I/O subsystem 500 and coupled adjacent to the IO7 400 is a PCI backplane manager (PBM) 502. The PBM 502 is part of a platform management infrastructure. The PBM 502 is coupled to a local area network (LAN), e.g., 100 base T LAN, by way of another I/O riser board 590 within the I/O drawer 500. The LAN provides an interconnect for the server management platform that includes, in addition to the PBM 502, a CPU Management Module (CMM) located on each 2P module 300 (FIG. 3) and an MBM (Marvel Backplane Manager).

Virtual Channels

The SMP system 200 also comprises a plurality of virtual channels including a Request channel, a Response channel, an I/O channel, a Forward channel and an Error channel. Each channel may be associated with its own buffer (not shown) on the EV7 processors 202. Ordering within a CPU 202 with respect to memory is achieved through the use of memory barrier (MB) instructions, whereas ordering in the I/O subsystem 500 is done both implicitly and explicitly. In the case of memory, references are ordered at the home memory of the cache line data in a directory in flight (DIF) data structure (e.g., table) 380 of the EV7 202.

Within the I/O channel, write operations are maintained in order relative to write operations and read operations are maintained in order relative to read operations. Moreover, write operations are allowed to pass read operations and write acknowledgements are used to confirm that their corresponding write operations have reached a point of coherency in the system. Ordering within the I/O channel is important from the perspective of any two end points. For example, if a first processor (EV7a) communicates with its associated IO7 (IO7a), then all operations must be maintained in order. However, communication between a second processor (EV7b) and IO7a is not maintained in order. If ordering is important, another mechanism, such as semaphores between EV7 processors 202, must be utilized.

Cache Coherency in the EV7 Domain

In the illustrative embodiment, a directory-based cache coherency policy is utilized in the SMP system 200. A portion of each memory data block or "cache line" is associated with the directory 380 (FIG. 3) and, as such, contains information about the current state of the cache line, as well as an indication of those EV7s 202 in the system 200 holding copies of the cache line. The EV7 202 allocates storage for directory information by using bits in the memory storage. For example, there may be 72 bytes of storage for each 64 bytes of data in a cache line, thereby leaving 8 additional bytes. A typical implementation allocates one byte of this excess storage for error correction code (ECC) coverage on the 8 bytes. The EV7 202 may alternatively allocate a 9-bit ECC on each 16 bytes of data. The cache states supported by the directory 380 include: invalid; exclusive-clean (processor has exclusive ownership of the data, and the value of the data is the same as in memory); dirty (processor has exclusive ownership of the data, and the value at the processor may be different than the value in memory); and shared (processor has a read-only copy of the data, and the value of the data is the same as in memory).

If a CPU 202 on a 2P module 300 requests a cache line that is resident on another 2P module 300, the CPU 202 on the latter module supplies the cache line from its memory 370 and updates the coherency state of that line within the directory 380. More specifically, in order to load data into its cache, an EV7 202 may issue a read_modify_request (ReadModReq) or an invalidate_to_dirty_request (InvaltoDirtyReq) message, among others, on the Request channel to the directory 380 identifying the requested data (e.g., the cache line). The directory 380 typically returns a block_exclusive_count (BlkExclusiveCnt) or an invalidate_to_dirty_response_count (InvaltoDirtyRespCnt) message on the Response channel (assuming access to the data is permitted). If the requested data is exclusively owned by another processor 202, the directory 380 will issue a read_forward (ReadForward) or a read_modify_forward (ReadModForward) message on the Forward channel to that processor 202. The processor 202 may acknowledge that it has invalidated its copy of the data with a Victim or VictimClean message on the Response channel.

The EV7 processor 202 supports the same I/O space ordering rules as the EV6 processor: load (LD)-LD ordering is maintained to the same IO7 400 or processor 202, store (ST)-ST ordering is maintained to the same IO7 or processor, LD-ST or ST-LD ordering is maintained to the same address, and LD-ST or ST-LD ordering is not maintained when the addresses are different. All of these ordering constraints are on a single processor basis to the same IO7 400 or processor 202. Multiple loads (to the same or different addresses) may be in flight without being responded to, though their in-flight order is maintained to the destination by the core/CBOX and the router. Similarly, multiple stores (the same or different addresses) can be in flight.

The EV7 processor 202 also supports peer-to-peer I/O. In order to avoid deadlock among peer IO7 "clients", write operations are able to bypass prior read operations. This is required because read responses cannot be returned until prior write operations have completed in order to maintain PCI ordering constraints. By allowing the write operations to bypass the read operations, it is guaranteed that the write operations will eventually drain, thereby guaranteeing that the read operations will eventually drain.

Cache Coherency in the I/O Domain

As described above, the EV7 processors 202 of system 200 implement a cache coherency protocol to ensure the coherency of data stored in their respective caches. Cache coherency may also be extended into the I/O domain. To implement I/O cache coherency where the IO7s 400 can be up to six meters away from their respective EV7 processors 202, if not farther, among other reasons, the IO7s 400 are required to obtain "exclusive" ownership of all data that they obtain from the processors 202 or the memory subsystems 370, even if the IO7 400 is only going to read the data. That is, the IO7s 400 are not permitted to obtain copies of data and hold that data in a "shared" state, as the EV7 processors 202 are permitted to do. In addition, upon receiving a ReadForward or a ReadModForward message on the Forward channel specifying data "exclusively" owned by an IO7 400, the IO7 400 immediately releases that data. More specifically, the IO7 400 invalidates its copy of the data and returns either a VictimClean or a Victim message to the directory 380 indicating that it has invalidated the data.

I/O Space Translation to System Space

The IO7s 400 basically provide the I/O devices, such as devices 448, 452, 470, with a "window" into system memory 370. The I/O devices may then use this window to access data (e.g., for purposes of read or write transactions) in memory 370.

Figure 6:
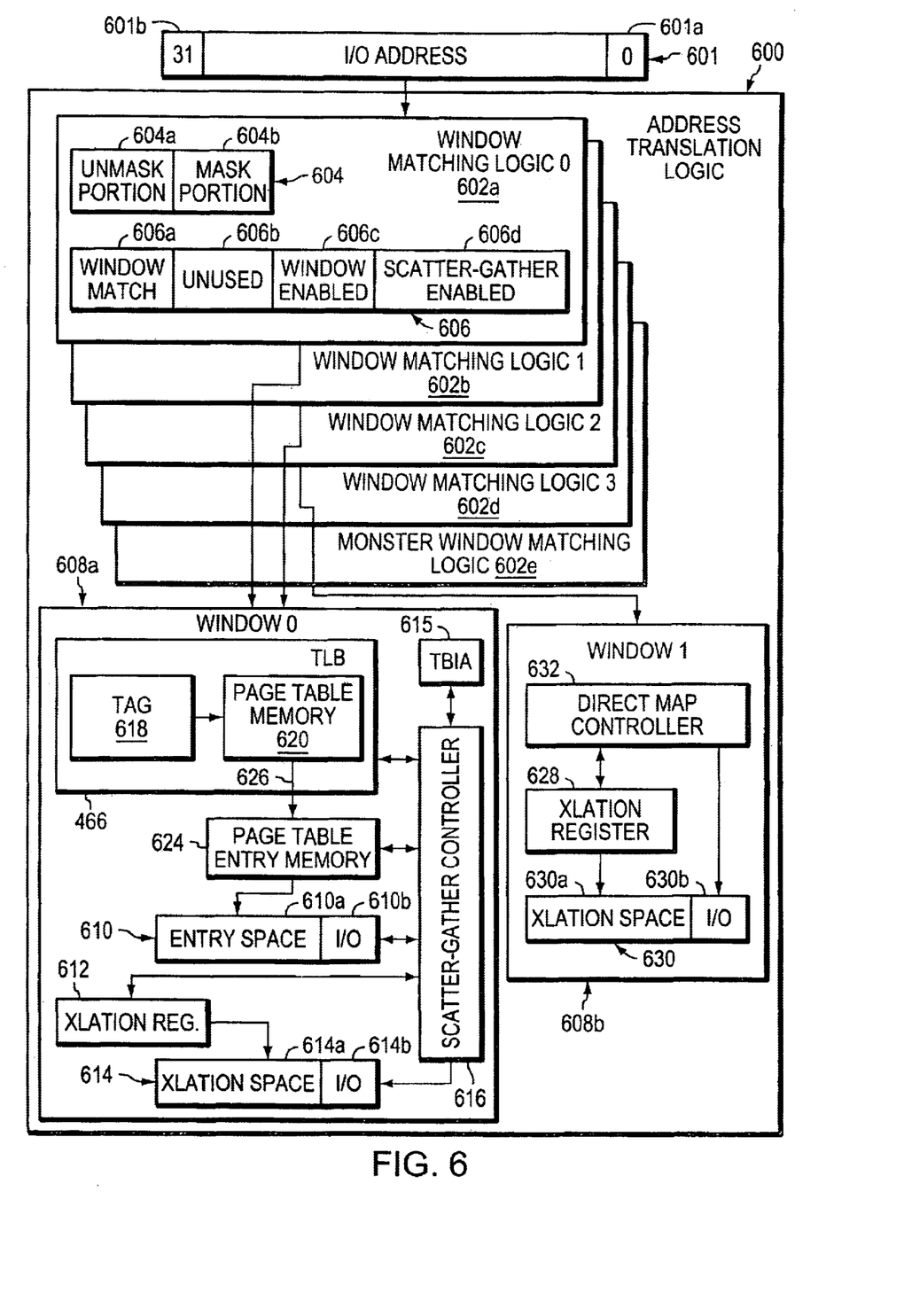
FIG. 6 is a schematic block diagram of an address translation circuit in accordance with the present invention.

FIG. 6 is a block diagram of a preferred address translation logic circuit 600 for use in translating an I/O domain address 601 to a corresponding system domain address. Each port 460 of an IO7 400 preferably includes an address translation logic 600. As mentioned above, the I/O domain address 601 is typically 32-bits long, thereby defining bit positions "0" 601a through "31" 601b, while system domain addresses may be 44 or 48 bits in length. Preferably, bit positions "5" through "0" of the I/O domain address 601 specify a byte within a cache line. For ease of description, bit ranges, such as bits 5 to 0 may be described by the notation "5:0". Furthermore, bit positions 12:06 specify a cache line within a page. Accordingly, it is bit positions 31:13 of the I/O domain address 601 that must typically be translated into a system address to return the requested information from memory 370. If the respective I/O device is using dual address cycle (DAC) messaging, the I/O domain address 601 may be 64 bits long (thereby defining bit positions 63:00).

Those skilled in the art will understand that both the I/O domain addresses and the system addresses may be other lengths.

The address translation logic 600 has a plurality of programmable address windows and one or more fixed address windows. As described below, the I/O domain addresses specified by each I/O device map to at least one window which translates the respective I/O domain address to a system address, thereby providing the respective I/O device with access to data stored in the memory subsystems 370 of the system 200. Each of the programmable windows, moreover, may be configured as either a direct-mapped window or as a scatter gather mapped window. The fixed window supports peer-to-peer (e.g., I/O device to I/O device) address translation as well as providing a view into the entire address space of the SMP system 200. Specifically, the address translation logic 600 comprises a plurality of window matching logic circuits 602a–e. Each window matching logic circuit 602a–e evaluates I/O domain addresses received at the respective port 460 of the IO7 400 and maps those I/O domain addresses to one or more respective window(s) that can translate the I/O domain addresses into system addresses. Each window matching logic circuit 602a–e includes a mask register 604 and a base register 606. The mask register 604 has an unmask portion 604a and a mask portion 604b. The base register 606 has a window match portion 606a, an unused portion 606b, a window enabled bit 606c and a scatter gather enabled bit 606d. Each matching logic circuit 602a–e is associated with a respective window 608, such as windows 608a and 608b, that translates an I/O domain address into a system address.

Window 608a is configured to implement scatter gather mapping of I/O domain addresses to system addresses, while window 608b is configured to implement direct mapping of I/O domain addresses to system addresses. Scatter gather window 608a includes or otherwise has access to the TLB 466. It also includes a system address register 610, a translation register 612, a TLB look-up buffer 614, an entry memory 624, and a TLB controller 616. The TLB controller 616 is coupled to the TLB 466, the system address register 610, the translation register 612, the TLB look-up buffer 614, and the entry memory 624. The TLB 466, moreover, includes a tag 618 that is coupled to a page table memory 620. The tag 618 is configured with a plurality of entries and, as described below, each tag entry is associated with a range of I/O addresses. Each tag entry also specifies a particular entry of page table memory 620, as indicated by arrow 626 leading from tag 618 into page table memory 620. The system address register 610 has an entry space portion 610a and an I/O portion 610b, and the TLB look up buffer 614 has a translation space portion 614a and an I/O portion 614b.

Direct mapping window 608b includes a translation register 628, a system address register 630, and a direct map controller 632 coupled to both the translation buffer 628 and the system address buffer 630. The system address register 630 of window 608b includes a translation space portion 630a and an I/O portion 630b.

The address translation logic 600, which is preferably part of the IO7 400, may be implemented in hardware through a plurality of registers and combinational logic configured to produce sequential logic circuits and cooperating state machines. Nonetheless, those skilled in the art will recognize that various combinations of software and hardware components may be advantageously utilized to achieve the objects of the present invention. The TLB 466, or portions thereof, including tag 618 is preferably implemented through one or more register arrays and logic circuits that are configured to operate like an associative or content addressable memory (CAM).

The address translation logic 600 may have other windows configured to implement scatter gather mapping and thus include or have access to the TLB 466.

In operation, an I/O device, such as I/O device 448 (FIG. 4), issues a DMA read transaction specifying a memory address in I/O domain terms (e.g., 32 bits). The DMA read is received at port P0 of the IO7 400. The IO7 400 extracts the I/O domain address 601 from the DMA read and passes it to the address translation logic 600 for port P0. Within the address translation logic 600, a segment (e.g., bits 31:20) of the I/O domain address 601 is provided to each window matching logic 602a–e. The selected bit range may be provided to each window matching logic 602 serially, or it may be applied to all (or less than all) of them simultaneously. The mask register 604 of each window matching logic 602 masks a portion of the received I/O domain address segment. For example, mask register 604 of window matching logic 602a may mask bits 28:20, matching logic 602b may mask bits 24:20, matching logic 602c may mask bits 31, 30 and 24:20, and matching logic 602d may mask bits 30 and 26:21. Each mask register 604 preferably includes 12 bit positions, and the masking may be accomplished by de-asserting each bit of the unmask portion 604a (e.g., setting each bit to "0"), asserting each bit the mask portion 604b (setting each bit to "1") and applying conventional logic gates (not shown).

The non-masked portion of the I/O domain address segment is then compared to the window match portion 606a of the base register 606 of each window matching logic 602. If the non-masked portion of the I/O domain address segment matches the window match portion 606a of the base register 606 of a given window matching logic 602, the I/O domain address 601 is passed to the window 608 associated with that window matching logic 602. Suppose, for example, that the respective segment of the I/O domain address 601 from I/O device 448 matches the window match portion of the base register for window matching logic 602c. The window matching logic 602c next determines whether the scatter gather enabled portion of its base register is asserted. If not, the I/O domain address is passed to window 608b, which has been programmed to implement direct mapping. Window 608b generates a corresponding system address by concatenating the contents of its translation register 628, which contains to the starting location of the direct mapped space in system memory, with the portion of the I/O domain address 601 that corresponds to the offset. For example, direct map controller 632 may copy the starting location from translation register 628 into the translation space portion 630a of system address register 630 and the offset from the selected I/O portion into I/O address portion 630b, thereby generating the translated system address for this I/O domain address. The system address generated by the address translation logic 600 is then used by the IO7 400 to obtain the respective data or information (e.g., the cache line) from the memory subsystem 370.

If the non-masked segment of a second I/O domain address 601 "hits" on window match portion 606a of window matching logic 602a which has its scatter gather enabled portion 606 asserted, this I/O domain address 601 is passed to window 608a which, as described above, has been configured to implement scatter gather mapping. The TLB controller 616 preferably extracts some portion (e.g., bits 31:16) of the I/O domain address 601 and inputs that portion to the tag 618 of the TLB 466 for comparison with the tag's entries. The tag 618 and the page table memory 620 basically cooperate so as to return, for each I/O domain address 601 input to the TLB 466, either a plurality of page table entries (PTEs) of a scatter gather map or zero PTEs. In the preferred embodiment, each entry of page table memory 620 contains eight consecutive PTEs.

Figure 7:
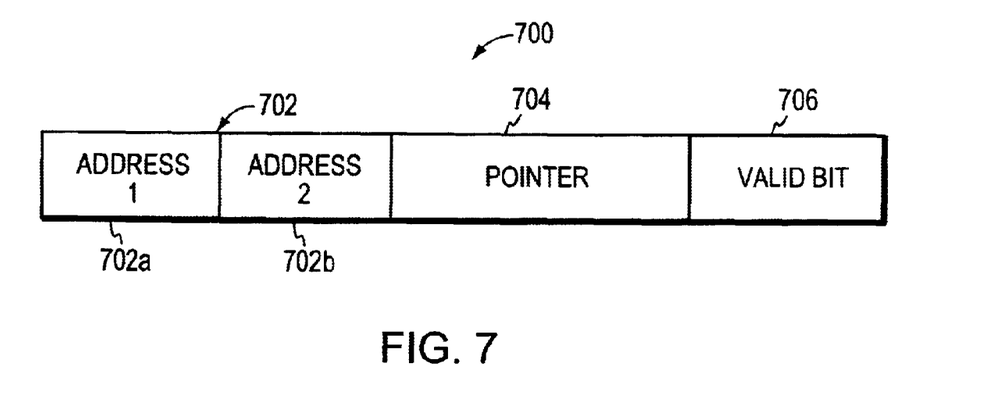
FIG. 7 is a schematic diagram of a tag entry used by the address translation circuit of FIG. 6.

FIG. 7 is a highly schematic representation of an entry 700 of tag 618. Tag 618 is preferably configured to contain eight separate entries 700. Each entry 700 includes an address portion 702. The address portion 702 includes two parts. A first part 702a contains a range of I/O domain addresses. In particular, first part 702a contains bits 31:16 of the I/O address range to which the particular tag entry 702 is associated. A second address part 702b contains all or part of the system address of the cache line containing the eight PTEs that are associated with this particular tag entry 700. The tag entry 700 further includes a pointer 704 that points to the first of the eight associated PTEs within page table memory 620. Accordingly, for the range of I/O domain addresses specified in first address part 702a, there are eight associated PTEs within page table memory 620.

Figure 8:
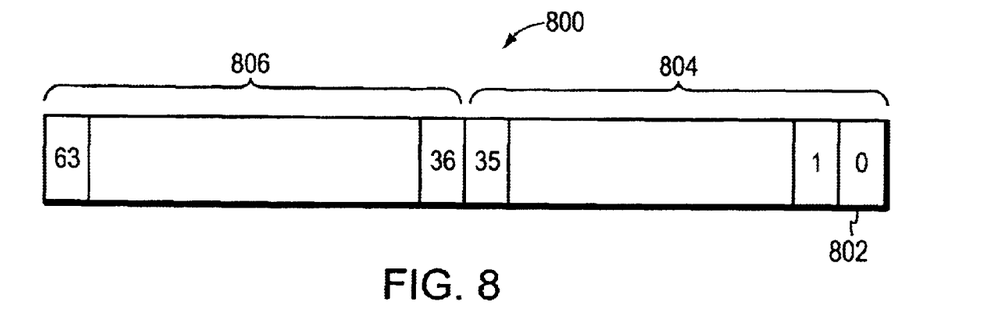
FIG. 8 is a schematic diagram of a page table entry used by the address translation circuit of FIG. 6.

FIG. 8 is a highly schematic representation of a PTE 800 of a scatter gather map in accordance with a preferred embodiment of the present invention. The PTE 800 may be sixty-four bits long. A first bit position 802, e.g., bit position "0", may be configured as a valid bit. A first bit range 804, e.g., bit positions 1:35, may be configured with bits 47:13 of the corresponding system address (i.e., the page table), while a second bit range 806, e.g., bit positions 63:36, may be left unused.

Assuming bits 31:16 of the I/O domain address 601 match an I/O address range within the first address part 702a of a tag entry 700, the corresponding eight PTEs from the page table memory 620 are provided to the entry memory 624 as indicated by arrow 626. The TLB controller 616 then uses the I/O domain address 601 or some portion thereof (preferably bits 15:13) as an index to identify a single PTE 800 from the eight PTEs returned by page table memory 620. For example, if bits 15:13 are "000", the TLB is controller 616 selects the first PTE 800. If bits 15:13 are "001", the TLB controller 616 selects the second PTE 800; if bits 15:13 are "010", it selects the third PTE 800; if bits 15:13 are "011", it selects the fourth PTE 800 and so on. The selected PTE 800 specifies at least part of the translated system address for the I/O domain address 601 that was input to the address translation logic 600.

Before utilizing the selected PTE 800 to generate the translated system address, the TLB controller 616 checks the PTE's valid bit 802. If the valid bit 702 is asserted, the PTE 700 is considered valid, and the TLB controller 616 uses it to generate the corresponding system address. Specifically, the TLB controller 616 concatenates the contents of the first bit range 804 from the selected PTE 800 (i.e., the page table) with bits 12:6 of the I/O domain address 601 (i.e., the cache line), thereby generating a 48 bit system address. Since bits 5:0 of both the I/O domain address 601 and the system address specify a particular byte within a given cache line, this range is not significant in obtaining the data of the respective cache line. To concatenate these two bit ranges, the TLB controller 616 may move the contents of the first bit range 804 from the selected PTE 800 into the entry space 610a of the system address register 610, and bits 12:6 of the I/O domain address 601 into the I/O space 610b of the system address register 610. The IO7 400 may then use the contents of the system address register 610 in generating the ReadModReq message sent to the interconnected EV7 processors 202 (the "EV7 mesh").

To generate a 44 bit system address, the TLB controller 616 may only use bits 35:6 of first bit range 804 (i.e., bits 44:13 of the system address).

If the valid bit 802 of the selected PTE 800 is de-asserted, then the PTE 800 is considered invalid by the TLB controller 616. In this case, the TLB controller does not use the selected PTE 800 to generate a system address. The IO7 400 may issue an error message to the I/O device that issued the I/O domain address 601 triggering the invalid PTE 800. The IO7 400 may also issue an error message to its EV7 processor 202.

It should be understood that valid bit 802 may be de-asserted within memory 370 by system software to indicate an error condition. The valid bit 802 may also be deasserted by IO7 400 to indicate that an error occurred during retrieval of the PTE 802 from memory 370 or during retrieval from TLB 466, among other reasons.

If the bit segment, e.g., bits 31:16, of the I/O domain address 601 input to the TLB 466 does not match any entry in the tag 618, then a "TLB miss" is said to occur. In response to a TLB miss, the TLB controller 616 requests additional PTEs 800 from the memory subsystem 370 for loading into the TLB 466. The additional PTEs are obtained by issuing a ReadModReq message to the EV7 mesh on the Request channel, which is then routed to the home directory 380 for processing. The cache line specified by the Read-ModReq is generated by concatenating a portion of the I/O domain address 601 that initiated the TLB miss with the contents of the translation register 612. The translation register 612 is preconfigured or programmed with the system address for the starting point or base of the scatter gather map being implemented by window 608a. The contents of translation register 612 may be copied into the translation space 614a of the TLB look-up register 614. A portion of the I/O domain address 601 which initiated the TLB miss is then copied into the I/O space 614b of the TLB look-up register 614 to generate the appropriate system address for the ReadModReq. The portion of the I/O domain address 601 selected for copying into the I/O space 614b is determined by the mask register 604. In particular, that portion of the I/O domain address 601 which is unmasked by un-mask portion 604a of the mask register 604 (i.e., bits n:13) from the corresponding window matching logic 602a is copied into I/O space 614b. The resulting system address is then used by the IO7 400 to obtain another eight consecutive PTEs 800 of the scatter gather map from the memory subsystem 370. Upon receiving the eight PTEs 800, the TLB controller 616 uses bits 15:13 to index to a selected one of the eight PTEs 800 as described above. The TLB controller 616 then checks the valid bit 802 of the selected PTE 800 and proceeds as described above.

In addition to obtaining the eight PTEs, the TLB controller 616 also receives a corresponding tag entry 700 for the eight new PTEs. That is, the cache line corresponding to the system address generated by the TLB controller 616 not only contains the eight PTEs, it also contains the corresponding tag entry 700 for these eight PTEs. The eight PTEs and tag entry are preferably loaded into open entries of the page table memory 620 and tag 618 of the TLB 466 for subsequent use by the TLB controller 616. If there are no open or unused entries within the tag 618 and page table memory 620 of the TLB 466, the TLB controller 616 preferably evicts an existing entry of tag 618 and page table memory 620. The TLB controller 616 may use a conventional "least recently used" (LRU) algorithm or it may use a round robin technique to select the entries of the tag 618 and the page table memory 620 that are to be evicted

Coherency of the I/O TLB

Figure 9A:
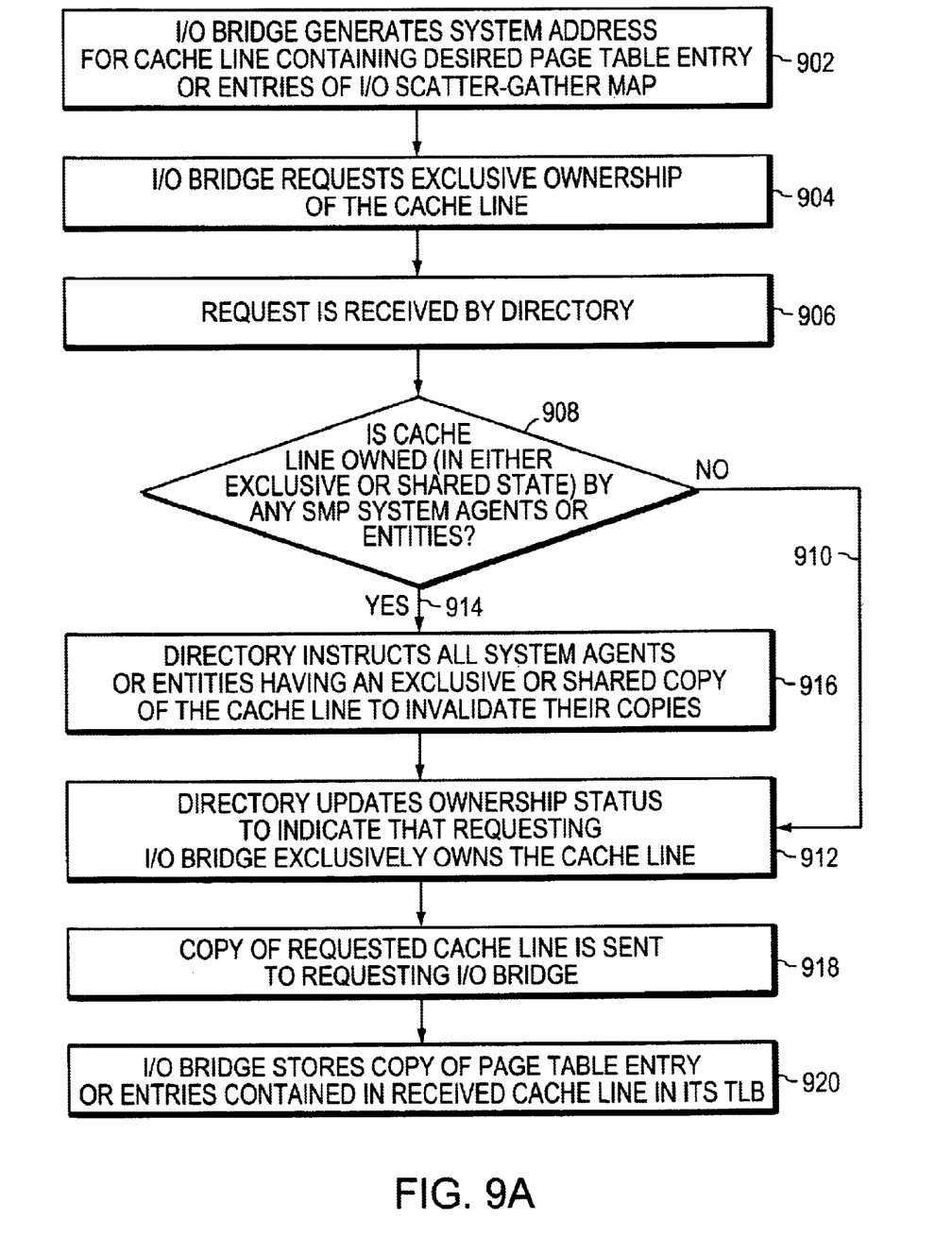
FIGS. 9A–B are flow diagrams of the methods of the present invention.
Figure 9B:
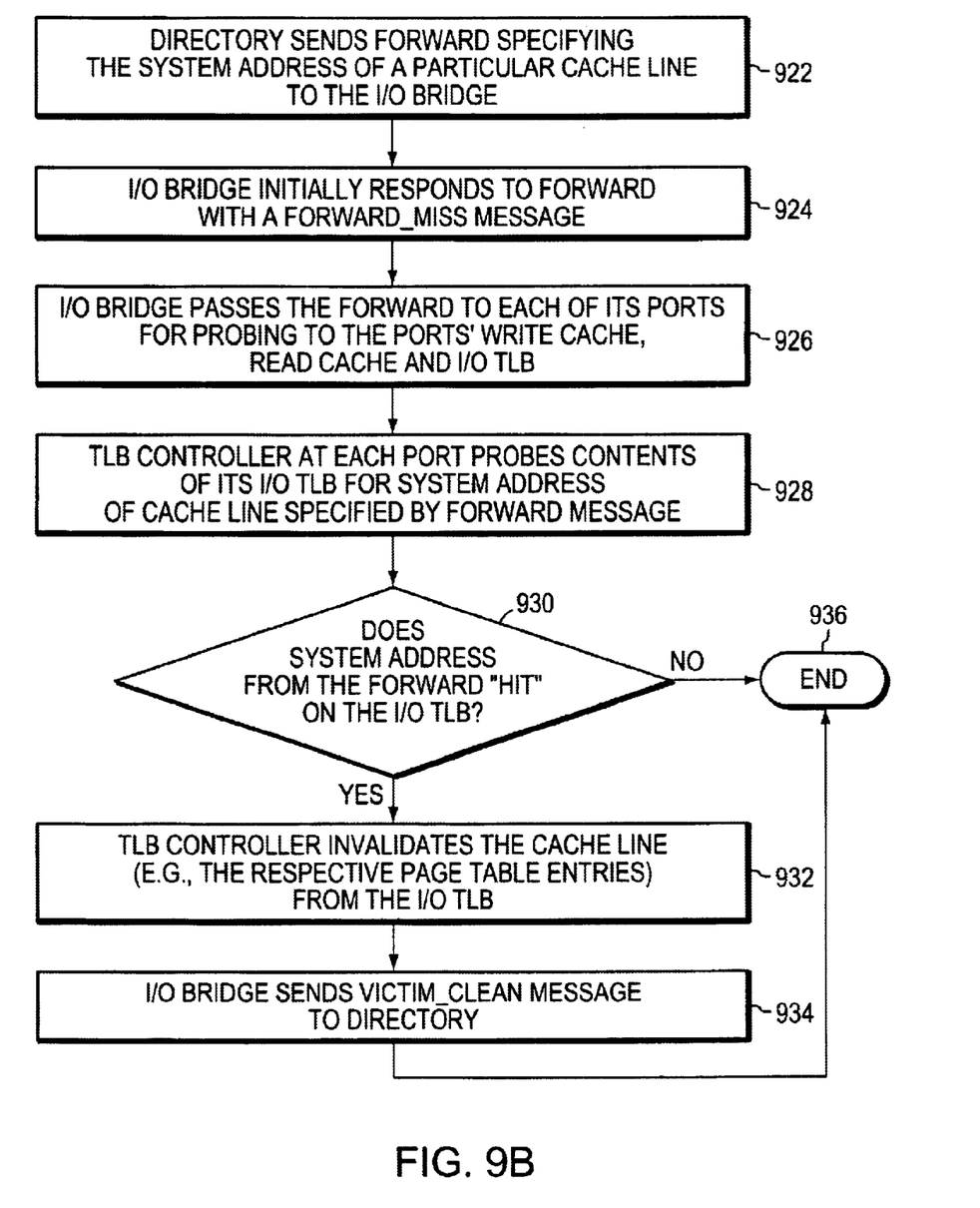

In accordance with the present invention, the contents of the TLB 466 disposed at each port 460 of an I/O bridge (i.e., an IO7) 400 are maintained coherent relative to the memory subsystems 370. FIGS. 9A–B are a flow diagram of the steps of the I/O TLB coherency protocol or method of the present invention. First, suppose an I/O domain address 601 is received at port P0 of a given IO7, which may be referred to as IO7 400a. As described above, the I/O domain address 601 is passed to the address translation logic 600 at port P0 for translation to a system address. Suppose further that the I/O domain address 601 is to be translated by means of a scatter gather map stored in a particular memory subsystem 370, and is thus passed to window 608a for translation into the corresponding system address. Suppose further that the I/O domain address 601 does not match any of the tag entries 700 of tag 618. That is, the TLB controller 616 detects a TLB miss for this I/O domain address 601.

As indicated at block 902, and as described above in detail, in response to the TLB miss, the TLB controller 616 generates a system address for the cache line that contains the PTE 800 having the translation for this I/O domain address 601 (as well as seven other PTEs 800). As indicated at block 904, the IO7 400a generates and sends a message requesting exclusive ownership of the cache line identified by the system address generated by the TLB controller 616. Preferably, the IO7 400a generates a ReadModReq specifying the system address for the cache line. The ReadModReq message is routed by the EV7 mesh to the home directory 380 that is responsible for the identified cache line, as indicated at block 906. The directory 380 checks the ownership status of the specified cache line to see whether the identified cache line is already owned either exclusively or in a shared state by any agent or entity of the SMP system 200, as indicated by decision block 908. A system agent or entity may include an EV7 processor 202 and/or its local cache, an IO7 400 and/or any of its WCs 462, RCs 464 or TLBs 466, or possible an I/O device coupled to the system 200. If the specified cache line is not owned by any other agent or entity, the directory 380 changes the ownership status of the cache line to reflect that IO7 400a is now the exclusive owner of the specified cache line, as indicated by no arrow 910 leading to block 912.

If the information at directory 380 indicates that the specified cache is owned by one or more agents and/or entities, the directory 380 instructs those agents and/or entities to invalidate their copies before granting IO7 400a exclusive ownership, as indicated by yes arrow 914 leading to block 916, and as described in more detail below.

The directory 380 then directs the particular EV7 processor 202 responsible for the memory subsystem 370 at which the cache line of the specified system address is stored to send a copy of the cache line to the IO7 400a, as indicated at block 918. In particular, the EV7 processor 202 preferably sends a BlkExclusiveCnt message to the IO7 400a on the response channel appending the requested cache line, where the count (Cnt) specifies the number of agents or entities (typically one or more EV7 processors) having a shared copy of the data. In this case, the count (Cnt) will typically be zero as the directory 380 instructed any other owners to invalidate their copies. If the count is non-zero, the IO7 400a (or the directory 380) may wait to receive enough invalidate_acknowledgement (InvalAck) messages from the other agents or entities having a copy of the cache line (acknowledging the fact that they invalidated their copies) to decrement the count to zero.

Upon obtaining the eight PTEs of the cache line, the TLB controller 616 stores them in the page table memory 620, as indicated at block 920. The TLB controller 616 may also identify the one PTE entry that translates the subject I/O domain address 601 by using the I/O domain address 601 as an index, and proceed as described above in generating the translated system address. As reflected by the ownership status information in the home directory 380, the TLB 466 of port P0 at IO7 400a now has exclusive ownership of the respective cache line with respect to all other agents and entities of the SMP system 200 (e.g., with respect to all EV7 processors 202 and other IO7s 400, including the TLBs of the other ports at this IO7 400a). The exclusively owned PTEs of this cache line, moreover, may now be used by window 608a to translate I/O domain addresses that map to this scatter gather map to system addresses, as described above.

Suppose some other agent or entity of the SMP system 200 (e.g., an EV7 processor 202 or another IO7, which may be referred to as 400b, or another TLB 466 on IO7 400a) wants to access these PTEs. An EV7 processor 202, for example, may want to modify the PTEs to reflect a change in the scatter gather map, while another IO7 400b (or another port on the same IO7 400a) may want to read the PTEs in order to translate an I/O domain address that it has received. To access the PTEs, the EV7 processor 202 may send an InvaltoDirtyReq or a ReadModReq message on the Request channel to the directory 380, while the other IO7 400b may send a ReadModReq message. The ReadModReq from IO7 400b would typically result from a TLB miss at its TLB 466. More specifically, in response to the TLB miss, the TLB controller 616 at IO7 400b generates a system address for the cache line containing the PTE (as well as seven other PTEs) of the respective scatter gather map, and the IO7 400b requests exclusive ownership of this cache line, as indicated at blocks 902, 904, described above. The ReadModReq message (or the InvaltoDirtyReq message from an EV7) is routed to the home directory 380 responsible for this cache line and, upon receiving the message, the directory 380 checks the ownership status of the specified cache line to see whether the identified cache line is already exclusively owned by any agent or entity of the SMP system 200, as indicated by blocks 906, 908.

As a result of the step of block 912, however, the information at directory 380 now indicates that the cache line is exclusively owned by IO7 400a. Accordingly, the response to decision block 908 is yes. In this case, the directory 380 sends a message to IO7 400a requesting that it relinquish its ownership of the cache line, as indicated at block 916. Specifically, the home directory 380 or the EV7 processor 202 responsible for the memory subsystem 370 at which the cache line is stored sends a ReadForward (or possibly a ReadModForward) message to IO7 400a on the forward channel, as indicated at block 922 (FIG. 9B). Before IO7 400a determines whether or not it has a copy of the cache line specified in the ReadForward message, it preferably replies to the directory 380 with a ForwardMiss message on the Response channel, as indicated at block 924. The North region 410 of IO7 400a, which received the ReadForward, then provides a copy of the forward to each port 460 of South region 450, so that the contents of the WC 462, RC 464 and TLB 466 of each port 460 in South region 450 may be probed for the system address of the forward, as indicated at block 926.

In particular, the TLB controller 616 at port P0 of IO7 400a probes TLB 466 for the system address specified in the ReadForward as received from North region 410, as indicated at block 928. To probe the TLB 466, the TLB controller 616 uses bits 47:16 from the system address of the ReadForward to search second address part 702b of segment 702 of each entry 700 of tag 618. As described above, the second address part 702b of each tag entry 700 contains all or part of the system address for the cache line containing the eight PTEs that are associated with that tag entry 700 and that are stored in a respective entry of page table memory 620. As indicated as decision block 930, the TLB controller 616 determines whether the system address of the forward "hits" an entry of TLB 466. Since the PTEs of the cache line specified by the forward are stored at page table memory 620, the forward "hits" on a tag entry 700 of tag 618.

In response to the TLB hit, the TLB controller 616 victimizes the cache line (i.e., the PTEs). In particular, the TLB controller 616 invalidates the eight PTEs from its page table memory 620 that correspond to the tag entry 400 that was "hit" by the forward, as indicated at block 932. Next, the TLB controller 616 or the IO7 400a sends a VictimClean message to the directory 380 on the response channel, as indicated at block 934. The VictimClean message acknowledges that TLB 466 at port P0 of IO7 400a has invalidated the cache line specified in the previously issued forward, and that the cache line (i.e., the PTEs) had not been modified by IO7 400a. That is, the cache line is "clean". Processing of the forward is now complete as indicated by end block 936. Upon receiving the VictimClean message, the directory 380 may now grant IO7 400b (or the EV7 processor 202 that seeks to read or modify the PTEs) exclusive access to the cache line.

Meanwhile, if port P0 at IO7 400a receives an I/O domain address 601 that would otherwise be translated by one of these PTEs, the TLB controller 616 responds with a TLB miss, as the PTEs have been invalidated from page table memory 620, as indicated at block 932 described above.

Accordingly, the IO7 400a must again request the PTEs from the directory 380 by sending a ReadModReq message to the EV7 mesh.

Had the forward not hit on an entry of the TLB 466, processing of the forward would be complete as indicated by no arrow 938 leading directly from decision block 930 to end block 936. As shown, the contents of the TLBs 466 at the ports 460 of IO7s 400 are maintained in a coherent manner without requiring the SMP system 200 to execute complicated TBIA instruction sequences at the IO7s 400, and thus without suffering the latencies and overhead inherent in such operations.

For example, by requiring I/O TLBs 466 to obtain exclusive ownership over scatter gather PTEs, when another agent or entity of the SMP system 200 requests the exclusively owned PTEs, the directory 380 only has to send a single forward message to the IO7 400 at which the PTEs are exclusively held. If multiple I/O TLBs 466 or some other coherent buffers at the IO7s 400 were permitted to keep shared copies of scatter gather PTEs, multiple forwards would have to be sent, if some agent or entity needed exclusive ownership over them (e.g., to write to the PTEs). As the IO7s 400 and hence the I/O TLBs 466 may be six meters or more away from the EV7 processors 202, the delays in sending and processing forwards to multiple IO7s 400 could add substantial delays to the EV7 processor 202 gaining exclusive ownership of the cache line containing the PTEs to be modified.

In order to support dual-address cycles (DACs), the window translation logic 600 (FIG. 6) may further include DAC comparison logic (not shown). The DAC comparison logic examines bits 63:32, which must be non-zero, of I/O domain addresses 601 received by the address translation logic 600. Preferably, the DAC comparison logic examines bits 49:48 for a preconfigured pattern. If bits 49:48 of the DAC I/O domain address match the preconfigured pattern (e.g., 01), the I/O address high order I/O address contained at bits 63:32 is also translated into a system address, as described above. That is, the high order address bits are discarded and replaced with the high order address bits of the translated system address, while the low order address bits are saved and concatenated with the high order system address bits.

Those skilled in the art will recognize that by writing to the various registers of is the address translation logic 600, such as the mask register 604, base register 606 and translation registers 612, 628, a user can basically program the address translation logic 600 to perform in a desired manner. In particular, the user can program the address translation logic 600 to direct map certain I/O domain addresses to a specific memory space, and to scatter gather map other I/O domain addresses. The user can also set the respective sizes of the system addresses spaces that are made available to I/O devices whether they are direct or scatter gather mapped.

It should be understood that the window base addresses as specified by the translation registers 612, 618 should be set to occur on naturally aligned address boundaries depending on the size of the respective window. For example, a 4MB window should not be programmed to start at address I MB. Instead, it should be programmed to start at addresses 4MB, 8MB, 12MB, etc.

Allocation of DMA Controllers

In a further aspect of the present invention, a novel mechanism for allocating DMA controllers 480 (FIG. 4) is described. In particular, upon receiving a new transaction (e.g., a DMA read or write specifying an I/O domain address) at a port 460 of an IO7 400, one or more of the DMA controllers 380 disposed at that port 460 are allocated to the transaction. Specifically, the allocation of DMA controllers 380 takes place before a translated system address is generated by the address translation logic 600 of the respective port 460. While the address translation logic 600 is processing the I/O domain address 601, each of the allocated DMA controllers 380 may be storing write or other information from the transaction either in its own buffer(s) or in the WC 462. The allocated DMA controllers 380 may also place the transaction in a queue established for passing transactions (or messages) to the North region 410 of the IO7 400. When the translated system address is returned from the address translation logic 600, the allocated DMA controllers 380 may update their address information for the respective transaction.

In this way, at least some processing of transactions may take place within South region 450 while the address translation logic 600 is translating an I/O address to a system address. The allocation of DMA controllers 480 in advance of receiving the translated system address, avoids or at least reduces delays and speeds up the processing of transactions by the IO7 400.

The foregoing description has been directed to specific embodiments of this invention. It will be apparent, however, that other variations and modifications may be made to the described embodiments, with the attainment of some or all of their advantages. For example, scatter gather window 608a may further include a translation buffer invalidate all (TBIA) register 615. If the TBIA register 615 is asserted, the TLB controller 618 preferably flushes the entire contents of its TLB 466 (e.g., the contents of page table memory 620). With the addition of a TBIA register 615 at the scatter gather windows, the present invention can support two modes of TLB coherence. The first mode described above does not rely on the issuance of TBIA instruction sequences, while the second mode relies on such operations. In particular, part of the TBIA instruction sequence would cause the contents of all (or some select number) of the TBIA registers 615 at the scatter gather windows to be asserted. In response to the assertion of their TBIA registers 615, the respective TLB controllers would flush their TLBs. Therefore, it is the object of the appended claims to cover all such variations and modifications as come within the true spirit and scope of the invention.

What is claimed is:

1. A method for ensuring coherency of address translation information stored in a translation look-aside buffer (TLB) disposed in a first input/output (I/O) bridge of a multiprocessor computer system comprising a plurality of interconnected processors, and one or more shared memories coupled to the processors, the method comprising the steps of:
   storing address translation information in the one or more shared memories;
   providing one or more directories configured to maintain coherency status of the address translation information stored in the one or more shared memories;
   receiving at a selected directory a request from the first I/O bridge for particular address translation information stored at the one or more shared memories;
   granting the first I/O bridge exclusive ownership to the requested address translation information stored at the one or more shared memories, at least in part, by updating the coherency status at the selected directory;
   sending the first I/O bridge a copy of the requested address translation information; and
   storing the copy of the requested address translation information at the TLB.

2. The method of claim 1 further comprising the steps of:
   determining whether one or more processors or one or more other I/O bridges have a copy of the address translation information requested by the first I/O bridge; and
   instructing the one or more processors and the one or more other I/O bridges to invalidate their respective copies of the requested address translation information.

3. The method of claim 2 further comprising the steps of:
   receiving an instruction at the first I/O bridge to invalidate a designated portion of the address translation information stored at the I/O bridge's TLB;
   invalidating the designated portion of address translation information from the TLB;
   sending an invalidation acknowledgement.

4. The method of claim 3 wherein, in response to the step of invalidating, the first bridge is blocked from using the designated portion of address translation information to translate an I/O address.

5. The method of claim 4, wherein the coherency status includes ownership status that is one of none, shared or exclusive, and wherein the step of granting further comprises the step of changing the ownership status for the address translation information requested by the first I/O bridge as stored at the one or more directories to exclusive.

6. An input/output bridge for use in a distributed shared memory computer system comprising a plurality of interconnected processors, one or more shared memories that are coupled to the processors and are configured into a plurality of blocks, and one or more directories for maintaining coherency status over information in the shared memories, wherein each memory block has a corresponding system address, the I/O bridge configured to provide one or more I/O devices with access to information in the shared memories, the I/O devices using I/O addresses, the I/O bridge comprising:
   at least one translation look-aside buffer (TLB) configured to store information for translating I/O addresses to system addresses; and
   a controller coupled to the TLB, the controller configured to:
      request, from a selected directory, exclusive ownership over translation information to be stored in the TLB; and
      invalidate translation information stored in the TLB in response to a request from the computer system, as initiated by one of the one or more directories.

7. The method of claim 1 wherein the multiprocessor computer system is free from having to execute an I/O TLB invalidate all (TBIA) operation to flush address translation information from the I/O bridge's TLB.

8. The method of claim 1 wherein the multiprocessor computer system is free from having to execute an I/O TLB invalidate sequence (TBIS) operation to flush address translation information from the I/O bridge's TLB.

9. The method of claim 1 wherein the I/O bridge includes address translation logic and the TLB is accessed by the address translation logic to translate an I/O domain address to a system address.

10. The method of claim 1 wherein the address translation information stored at the TLB translates I/O domain addresses to system addresses.

11. The method of claim 10 wherein the address translation information is in the form of one or more Page Table Entries (PTEs).

12. The method of claim 1 further comprising the steps of:
receiving an instruction at the first I/O bridge to invalidate a designated portion of the address translation information stored at the I/O bridge's TLB;
invalidating the designated portion of address translation information from the TLB; and
sending an invalidation acknowledgment.

13. The method of claim 1 wherein the address translation information is in the form of one or more Page Table Entries (PTEs).

14. The method of claim 5 wherein the one or more directories are further modified so as to store an identifier (ID) of the first I/O bridge that requested exclusive ownership of the address translation information.

15. The I/O bridge of claim 6 further comprising:
a first region that interfaces to one or more of the processors; and
a second region having one or more I/O ports.

16. The I/O bridge of claim 15 wherein the one or more I/O ports of the I/O bridge are configured in accordance with one of the Peripheral Component Interface (PCI), PCI-Extended (PCI-X) and Accelerated Graphics Port (AGP) bus standards.

17. The I/O bridge of claim 15 wherein the second region further includes one or more Direct Memory Access (DMA) controllers configured to manage read and write operations initiated by the one or more I/O devices.

18. The I/O bridge of claim 15 wherein the I/O bridge is an Application Specific Integrated Circuit (ASIC).

19. The I/O bridge of claim 6 further comprising a plurality of windows, each window configured to translate a range of I/O domain addresses to system addresses.

20. The I/O bridge of claim 19 wherein each window is configured in one of scatter-gather mapped and directed-mapped modes.

21. The I/O bridge of claim 20 wherein the at least one TLB is disposed in a selected window configured in scatter-gather mapped mode.

22. The I/O bridge of claim 6 wherein the information for translating I/O addresses to system address is in the form of Page Table Entries (PTEs).

23. The I/O bridge of claim 6 wherein
the computer system includes one or more directories for ownership status for address translation information, and
the one or more directories, in response to the request issued by the controller, change the ownership status of the requested translation information to exclusive.

24. The I/O bridge of claim 6 wherein the controller issues an acknowledgment upon invalidating translation information.

25. An input/output (I/O) bridge for use in a computer system having one or more processors, one or more shared memories that are accessible to the one or more processors, the one or more shared memories storing address translation information, and one or more directories for maintaining coherency status over information in the shared memories, the I/O bridge comprising:
means for communicating with one or more I/O devices coupled to the I/O bridge;
means for communicating with the one or more shared memories;
means for requesting, of a particular one of the one or more directories, exclusive ownership over selected address translation information stored at the one or more shared memories; and
means for storing, at the I/O bridge, the selected address translation information over which the I/O bridge obtained exclusive ownership.

26. The I/O bridge of claim 25 further comprising means for invalidating the selected address translation information stored at the I/O bridge.

27. The I/O bridge of claim 26 wherein the invalidating means is configured to issue an Invalid_Acknowledgment message confirming invalidation of the selected address translation information.

* * * * *